Aug. 23, 1966　　　　J. L. BURG　　　3,267,772
QUICK POSITIONING TABLE
Filed April 23, 1964　　　　　　　2 Sheets-Sheet 1
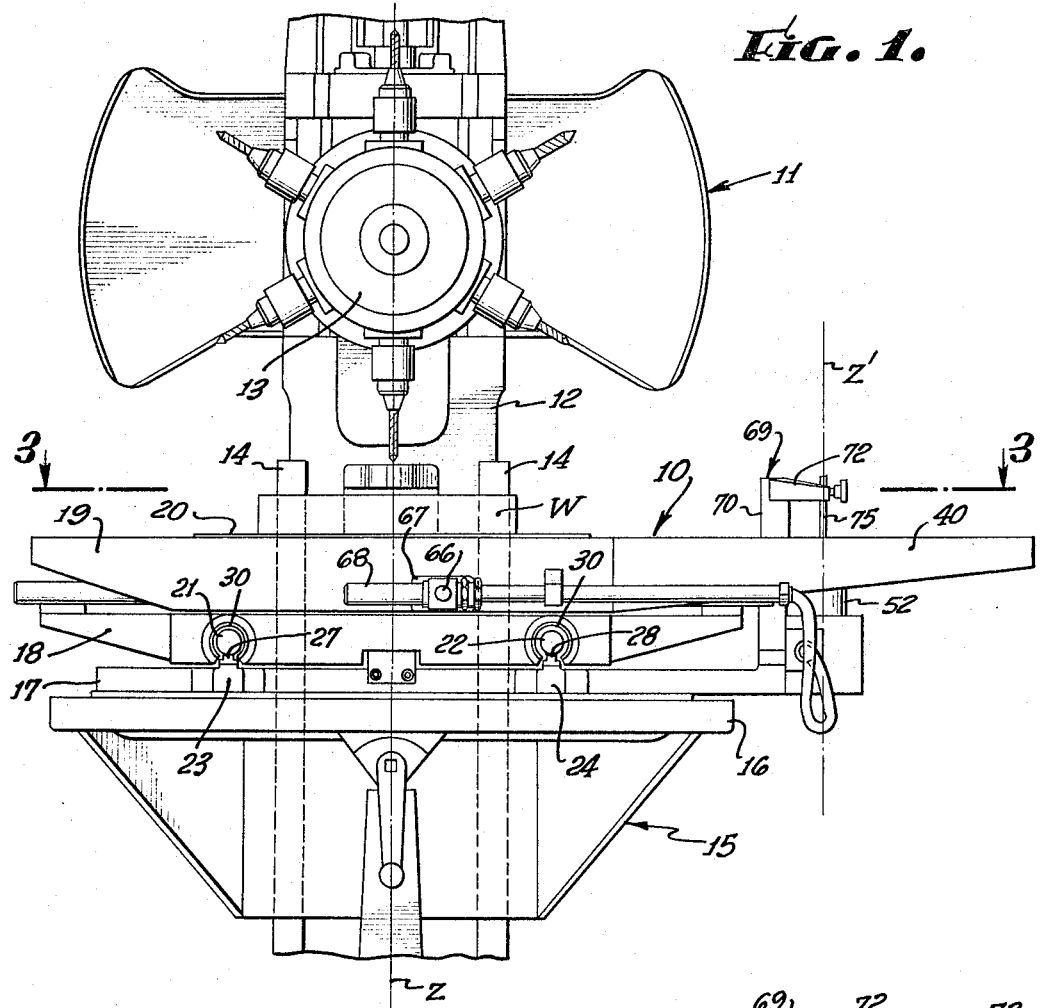
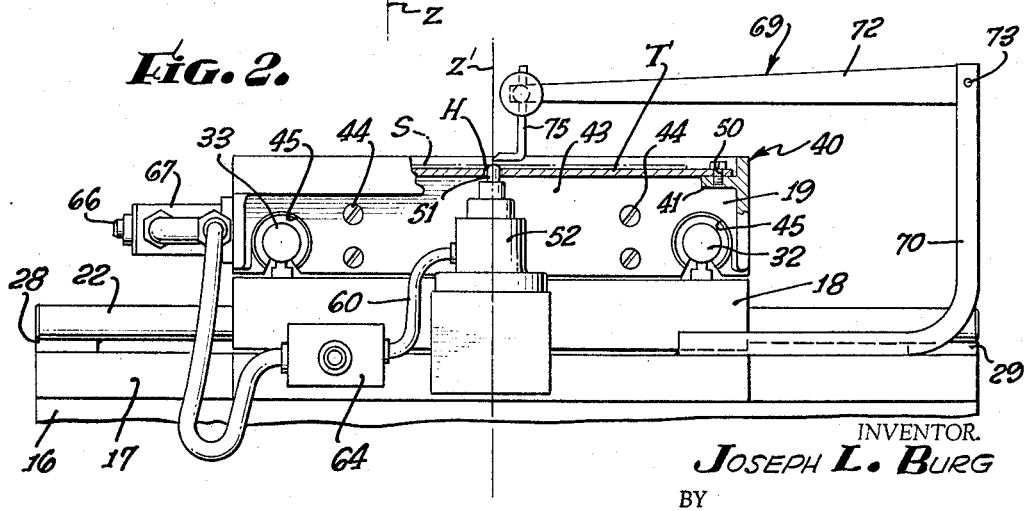
INVENTOR.
JOSEPH L. BURG
BY
Flam and Flam
ATTORNEYS.

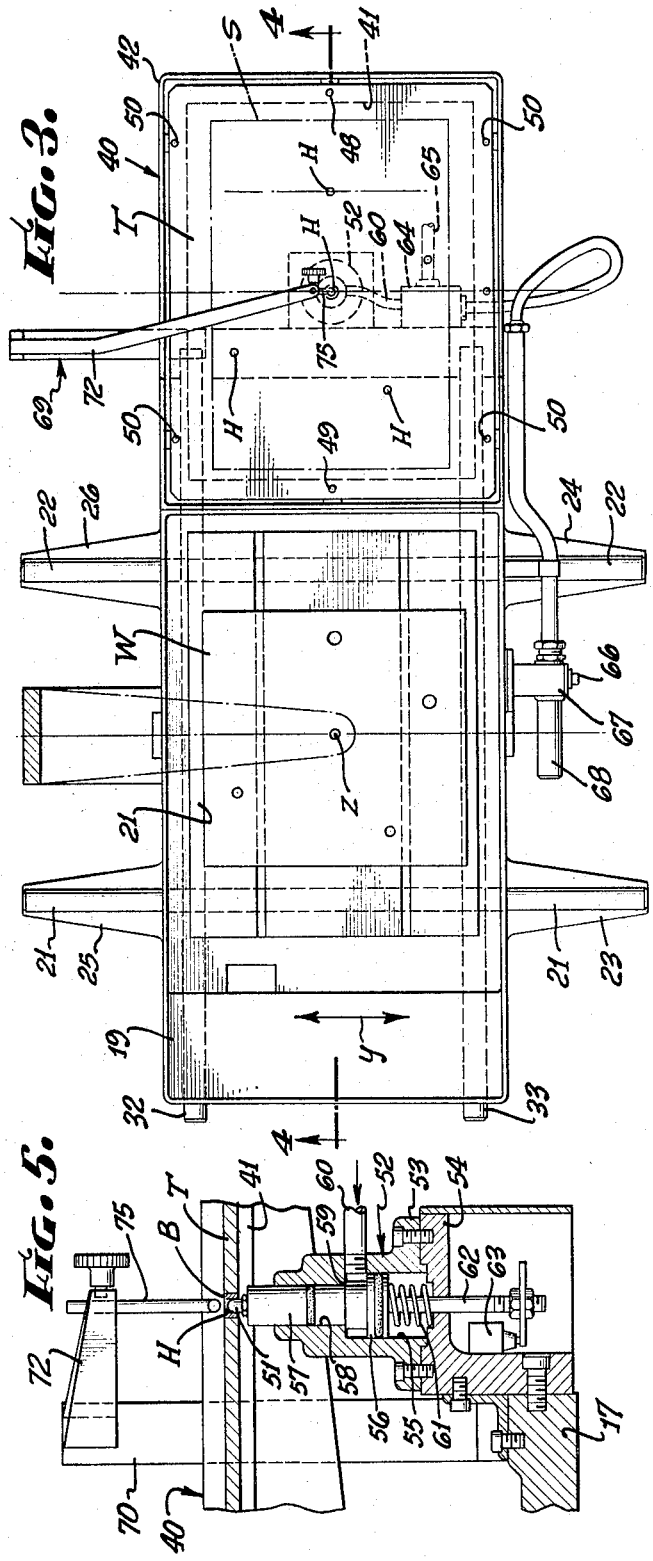
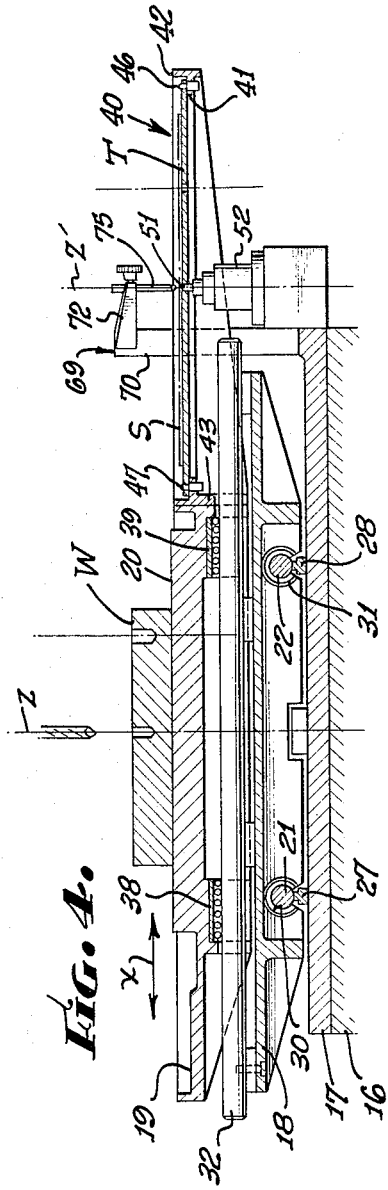

United States Patent Office 3,267,772
Patented August 23, 1966

3,267,772
QUICK POSITIONING TABLE
Joseph L. Burg, Beverly Hills, Calif., assignor, by mesne assignments, to Houdaille Industries, Inc., Buffalo, N.Y., a corporation of Michigan
Filed Apr. 23, 1964, Ser. No. 361,949
12 Claims. (Cl. 77—64)

The present invention relates to machine tools, and more particularly to a quick positioning table having a template holder whereby machine operations may be performed at a number of accurately located positions upon a workpiece.

Certain known devices of this character utilize templates secured in offset relationship to the work table, the template and the work table being correspondingly positioned in a two dimensional coordinate system perpendicular to the tool axis. The template has a series of holes each selectively registrable with an indexing pin having a fixed offset relationship to the tool axis. As the pin registers with any hole, the position of the work table relative to the tool axis is accurately determined. In order to expedite the machining of the work, a shop drawing may be secured to a frontal ledge of the work table for traverse beneath a stationary pointer. Thus the machinist can select the proper operation in accordance with the legends at the position indicated by the pointer, and he can also by such means find the corresponding template hole. An arrangement of this type has certain disadvantages. The work, if large, may interfere with the template and locating pin. Chips and foreign particles may prevent the locating pin from appropriate access to the template holes. Down time consequently results. In an attempt to overcome this disadvantage, it has been proposed to locate the template underneath the work table. This, however is a fairly inaccessible position for purposes of template replacement. A shop drawing ledge must yet be provided.

The primary object of this invention is to provide an improved template mounting for a quick positioning table in which the template, although quite accessible for installation and removal, does not interfere with the work. Thus the work can actually overlie the template.

Another object of this invention is to provide a table of this character in which the template holes are so situated that they are not obscured by chips.

Another object of this invention is to provide a table of this character in which shop drawings are conveniently and accessibly placed for cooperation with a stationary pointer even though no special support for drawings is provided.

For this purpose, the work table has a frame offset laterally and downwardly from the work table surface for receiving the template. The undersurface of the template is exposed for cooperation with a locating pin mounted on the work table support and the top surface of the template forms a surface upon which a shop drawing may, if desired, be placed. A retractable pointer directly overlies the locating pin.

Another object of this invention is to provide a simple accessible remote control system for operating the locating pin.

This invention possesses many other advantages, and has other objects which may be made more clearly apparent from a consideration of one embodiment of the invention. For this purpose, there is shown a form in the drawings accompanying and forming a part of the present specification, and which drawings are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a front elevational view of a quick positioning table incorporating the present invention installed on a typical machine tool;

FIG. 2 is an end elevational view of the quick positioning table;

FIG. 3 is an enlarged horizontal sectional view taken along the plane indicated by line 3—3 of FIG. 1;

FIG. 4 is a vertical sectional view taken along a plane indicated by line 4—4 of FIG. 3; and FIG. 5 is an enlarged fragmentary sectional view showing the locating pin and its operating mechanism.

In FIG. 1 the quick positioning table 10 is shown installed, by way of example, upon the turret drill machine 11 of a type shown and described in Patent No. 2,670,636 issued to Fred G. Burg on March 2, 1954. The machine tool 11 has a standard 12 upon which the turret head 13 is mounted. The standard 12 also has vertical dovetail guides 14 upon which a work supporting frame 15 is adjustably mounted. The frame has a work table 16 that serves in this instance as a bed upon which the quick positioning table 10 is installed.

The quick positioning table 10 as shown in FIG. 4 includes a bed plate 17 detachably secured to the machine bed 16 in a suitable manner so as to be substantially centered beneath the tool axis $z$. Mounted upon the bed plate 17 are a pair of carriages 18 and 19. The upper carriage 19 has a flat surface 20 provided with suitable ways cooperable with work clamps (not shown) to secure the work W.

The upper carriage 19 is mounted upon the lower carriage 18, and the lower carriage 18 in turn is mounted upon the bed plate so as to make possible movement of the work W in a rectangular coordinate system. For this purpose the bed plate 17 carries a pair of spaced parallel cylindrical guide rods 21 and 22 that extend generally from the front to the rear of the bed plate 17. The bed plate 17 (FIGS. 1, 2 and 3) has frontally projecting bearing pads 23 and 24 for the front ends of the guide rods, and rearwardly projecting bearing pads 25 and 26 for the rear ends of the guide rods. Seats 27 and 28 (FIG. 1) support the front ends of the rods 21 and 22 and similar pads (one of which 29 is shown in FIG. 2) support the rear ends of the rods 21 and 22. The intermediate portions of the guide rods 21 and 22 are elevated and spaced above the bed plate 17.

The lower carriage carries two pairs of bearing units on its under surface for receiving the guide rods. Two bearing units 30 and 31 are shown in FIG. 4.

The dimension of the lower carriage 18 in a direction along the guide rods 21 and 22 is substantially less than free length of the guide rods. Accordingly the lower carriage is supported for a substantial excursion in the $y$ direction beneath the tool axis $z$.

The lower carriage 18 at its upper surface mounts a pair of guide rods 32 and 33. These guide rods 32 and 33 extend perpendicular to the guide rods 21 and 22. The ends of the upper guide rods 32 and 33 are mounted upon bearing pads which project from sides of the lower carriage 18. The rods 32 and 33 intermediate their ends are spaced above the top of the carriage 18.

Bearing units as at 38 and 39 (FIG. 4) secured to the under surface of the upper carriage 19 telescopically receive the guide rods 32 and 33 for movement of the carriage 19 in the $x$ direction. The transverse dimension of the upper carriage 19 is substantially less than the free length of the guide rods 32 and 33. Accordingly the upper carriage 19 has a substantial range of movement in the $x$ direction. A template frame 40 is cantilevered to the right hand side wall of the upper carriage 19. The frame 40 in this instance is made as a part separable from the carriage 19. The frame 40 as shown in FIGS. 3 and 4 is substantially of open box-like rectangular configuration. The frame has an inwardly extending template supporting ledge flange 41 located just beneath the top edge 42 of the frame. One side wall 43 of the frame butts up against the side surface of the upper carriage 19 and is secured thereto by suitable fastening devices as at 44 (FIG. 2). The side wall 43 has arcuate recesses 45 to allow passage of the guide rods 32 and 33. The template frame is so situated that its upper edge 42 (FIGS. 1 and 4) lies in a horizontal plane slightly lower than the carriage surface 20.

The template T is designed to rest upon the inwardly directed flange 41 and to be held in a fixed position by the aid of upwardly projecting guide pins 46 and 47 fastened to the flange 41 and entering locating apertures 48 and 49 at opposite edges of the template. If desired the template may be secured by a series of screws passing through other apertures 50 and cooperable with threaded apertures in the template frame flange 41.

The template has a series of holes H accurately located with respect to each other for duplication in the work W. These holes may be lined by a suitable bushing B (FIG. 5). Cooperable with the holes H from the underside of the template is a locating pin 51. The locating pin is mounted upon the bed plate 17 for limited vertical movement into an out of the template holes H. For this purpose a pneumatic cylinder 52 is provided.

The cylinder 52 has a body 53 fastened upon one flange of a right angle support 54, the other flange being secured to the side edge of the bed plate 17.

The body 53 has a downwardly opening cylinder 55. A piston 56 works in the cylinder. A plunger 57 carried by the piston projects upwardly through a bore 58 and at its projecting end adjustably mounts the locating pin. The pin, which may be replaced, may take a variety of forms to conform to the size and configuration of the template holes H. For example, for a close hole pattern, a smaller pin would be required. The pin may incorporate a rolling element to facilitate its cooperation with the template holes. An annular shoulder 59 formed at the base of the plunger 57 limits upward movement and prevents the piston 56 from closely approaching the top of the cylinder.

Fluid pressure may be admitted to the top of the cylinder through a supply conduit 60 for retracting the locating pin. When the supply of fluid pressure is interrupted, a spring 61 returns the piston to the position shown. The spring 61 is seated on the horizontal flange on the bracket 54. A stem 62 depending from the piston projecting downwardly and actuates a switch 63 that is used as an interlock to prevent the turret head or spindle of an automatic machine from moving downwardly until the locating pin is up, thus protecting the work from damage and properly controlling the automatic cycle. In a manual machine, a signal light is operated by the switch so that the machinist can perceive that the pin is properly in position.

In order to operate the pneumatic cylinder and thus to release pin 51, a solenoid control valve 64 is provided (see FIGS. 2 and 3). Solenoid valve 64 is fastened to the side of the bed plate 17 adjacent to the valve structure. When deenergized, the solenoid interrupts the supply of air to the conduit 60. When energized, the conduit 60 is connected to a source conduit 65 (FIG. 3).

The energization circuit for the solenoid valve 64 is controlled by a normally open switch 66 (see FIGS. 1, 2 and 3). This switch is mounted upon a handle structure 67 affixed to the front of the upper carriage 19. The handle 67 has a grip part 68 that projects laterally to the left so that it may be readily gripped by the left hand of the operator with the thumb over the button actuator for the switch 66. When in use, the machinist grasps the handle 67 at the grip portion and depresses the button actuator thus causing the locating pin 51 to be retracted. Thereupon the carriages are moved to a position adjacent another one of the holes. In a simple part the holes H are readily identified.

In order to assist the machinst in finding the axis of the locking pin 51, a pointer structure 69 is provided. The pointer structure 69 is shown most clearly in FIG. 2. It includes an angled mounting arm 70 having one end fastened to the rear corner of the bed plate 17. The other end of the arm 70 terminates in a clevis. A beam 72 is pivotally mounted at the clevis by a pin 73. The beam 72 projects forwardly and overlies the bed plate 17. It has a slot adjustably mounting a pointer 75 as by the aid of a screw. The end of the pointer 75 is located at the axis $z'$ of the pin 51.

In some instances it may be desirable to use a shop drawing with the template T. The shop drawing S may be accurately superimposed upon the template and secured as by the aid of tape or adhesive. When the shop drawing S is in place the template holes H are quite well protected from the entrance of metal chips. But even when the shop drawing is not used the chips normally tend to adhere only about the upper surface of the template and do not interfere with the lower part of the holes H where the pin enters.

Since the template frame does not project above the operative work surface 20, the work itself may partially overlie the template. In such circumstances, the beam 72 may be pivoted upwardly.

The template frame 40 is quite accessible for installation and removal of various templates.

The subject matter claimed is:

1. For use with a machine tool having a bed: a support; a work table having a surface; means mounting the work table on the support for movement in a rectangular coordinate system; said work table having an open frame for detachably receiving a template, said frame being located laterally of said surface; locating means mounted on the support beneath the frame and for movement toward and away from the frame for interlocking template; and means for positioning the locating means.

2. For use with a machine tool having a bed: a support; a work table having a surface; means mounting the work table on the support for movement in a rectangular coordinate system; said work table having an open frame for detachably receiving a template, said frame being located laterally of said surface; said frame having an upper edge located at or below the level of said surface; locating means mounted on the support beneath the frame and for movement toward and away from the frame for interlocking template; and means for positioning the locating means.

3. For use with a machine tool having bed: a support; a work table having a surface; means mounting the work table on the support for movement in a rectangular coordinate system; said work table having an open frame for detachably reeciving a template, said frame being located laterally of said surface; said frame having an inwardly extending continuous flange recessed below the top edge of the frame and forming a ledge for a template; locating means mounted on the support beneath the frame and for movement toward and away from the frame for interlocking template; and means for positioning the locating means.

4. For use with a machine tool having a bed: a support; a work table having a surface means mounting the work table on the support for movement in a rectangular coordinate system; said work table having an open frame for detachably receiving a template, said frame being located laterally of said surface; locating means mounted on the support beneath the frame and for movement toward and away from the frame for interlocking template; means for positioning the locating means; and a pointer mounted on said support and overlying the frame to indicate the position of said locating means.

5. For use with a machine tool having a bed: a support; a work table having a surface; means mounting the work table on the support for movement in a rectangular coordinate system; said work table having an open frame for detachably receiving a template, said frame being located laterally of said surface; locating means mounted on the support beneath the frame and for movement toward and away from the frame for interlocking template; a handle secured to the work table; an actuator adjacent the handle for retracting the locating means.

6. For use with a machine tool having a bed: a support; a work table having a surface; means mounting the work table on the support for movement in a rectangular coordinate system; said work table having an open frame for detachably receiving a template, said frame being located laterally of said surface; locating means mounted on the support beneath the frame and for movement toward and away from the frame for interlocking template; remotely controllable means for moving the locating means to locking and releasing positions; and an actuator accessibly located relative to the work table for operating said remotely controllable means.

7. For use with a machine tool having a bed: a support; a work table having a surface; means mounting the work table on the support for movement in a rectangular coordinate system; said work table having an open frame for detachably receiving a template, said frame being located laterally of said surface; locating means mounted on the support beneath the frame and for movement toward and away from the frame for interlocking template; means for positioning the locating means; and a pointer retractably mounted on said support and overlying the frame to indicate the position of said locating means.

8. For use with a machine tool having a bed: a support; a work table having a surface; means mounting the work table on the support for movement in a rectangular coordinate system; said work table having an open frame for detachably receiving a template, said frame being located laterally of said surface; locating means mounted on the support beneath the frame and for movement toward and away from the frame for interlocking template; means for moving the locating means between limits; and a control member operated when the locating means is at one limit for preventing operations upon the work.

9. For use with a machine tool having a bed: a support; a work table having a surface; means mounting the work table on the support for movement in a rectangular coordinate system; said work table having an open frame for detachably receiving a template, said frame being located laterally of said surface; a locating pin mounted on the support beneath the frame and for movement toward and away from the frame for interlocking template; and means for positioning the locating pin.

10. For use with a machine tool having a bed: a support; a work table having a surface; means mounting the work table on the support for movement in a rectangular coordinate system; said work table having an open frame for detachably receiving a template, said frame being located laterally of said surface; a locating pin mounted on the support beneath the frame and for movement toward and away from the frame for interlocking template; means for positioning the locating pin; and a pointer mounted on said support and overlying the frame to indicate the position of said locating pin.

11. For use with a machine tool having a bed and means for automatically advancing a tool toward and from the bed: a support; a work table having a surface; means mounting the work table for movement in a rectangular coordinate system; said work table having a frame for detachably receiving a template; locating means mounted on the support for movement toward and away from the frame for interlocking the template; and means sensing the position of the locating means relative to the template for controlling the said advancing means.

12. For use with a machine tool having a bed and means for manually advancing a tool toward and from the bed: a support; means mounting the work table on the support for movement in a rectangular coordinate system; said work table having means for detachably supporting a template having an operative surface facing opposite the work table surface; locating means mounted on the support for movement toward and away from said template surface for interlocking the template; and means for indicating when the locating means is in interlocking position.

References Cited by the Examiner

FOREIGN PATENTS 863,437    1/1953    Germany.
894,258    4/1962    Great Britain.

FRANCIS S. HUSAR, *Primary Examiner.*